United States Patent [19]

Clark

[11] 4,306,704

[45] Dec. 22, 1981

[54] SELF-HEATED SOLENOID

[75] Inventor: John F. Clark, Princeton, N.J.

[73] Assignee: RCA Corporation, New York, N.Y.

[21] Appl. No.: 132,136

[22] Filed: Mar. 20, 1980

[51] Int. Cl.³ .................... F16K 49/00; F16K 31/06; H01F 7/16

[52] U.S. Cl. .................................. 251/137; 137/341; 137/375; 335/268

[58] Field of Search ............... 137/341, 375; 251/137; 335/268

[56] References Cited

U.S. PATENT DOCUMENTS

| | | |
|---|---|---|
| 2,069,003 | 1/1937 | Beman . |
| 2,084,680 | 6/1937 | Grosswege et al. ............ 251/137 X |
| 2,152,524 | 3/1939 | Miller .................................. 361/210 |
| 2,824,922 | 2/1958 | Jennings . |
| 3,022,400 | 2/1962 | Ahlefeldt . |
| 3,148,694 | 9/1964 | Casey et al. ........................ 137/203 |

Primary Examiner—Gerald A. Michalsky
Attorney, Agent, or Firm—Samuel Cohen; William Squire

[57] ABSTRACT

A solenoid comprises two coils wound on a common axis and a core within the coils which is supported for movement along the axis. Direct currents are applied substantially continuously to the two coils for resistively heating the solenoid to a temperature substantially above the ambient temperature. The direct currents are applied in the same direction to the two coils to produce additive magnetomotive forces when it is desired to energize the solenoid and in opposite directions to the two coils to produce subtractive magnetomotive forces which tend to cancel, when it is desired that the solenoid be in its unenergized condition.

10 Claims, 1 Drawing Figure

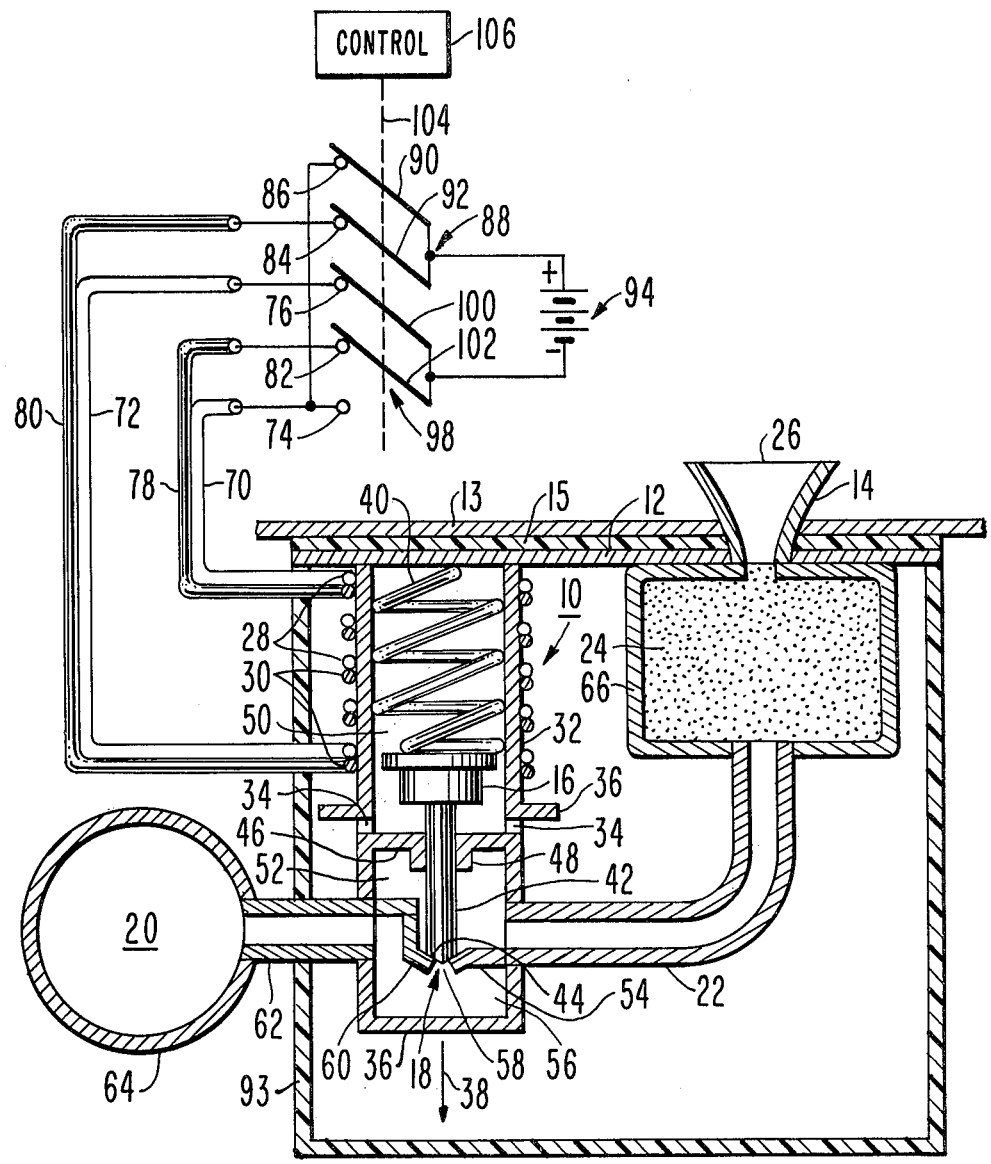

SELF-HEATED SOLENOID

The present invention relates to solenoids.

At below freezing temperatures, a solenoid may become inoperative because water vapor condenses on the parts and then freezes, preventing the parts from moving. Auxiliary heating means may be employed to solve this problem. However, this adds to the complexity and cost of the system.

A solenoid embodying the present invention comprises coil means responsive to an applied DC voltage for producing first and second magnetomotive forces along a common axis. Depending upon the direction of application of the voltage to the coil means, the magnetomotive forces may be additive or subtractive. In response to the additive forces, the solenoid is energized and its core is driven, and when the magnetomotive forces are subtractive, the core remains unactuated. DC currents substantially continuously flow through the coil means regardless of the direction of application of the voltage and these cause resistive heating of the coil means, raising the operating temperature of the solenoid.

The sole drawing FIGURE is a partial sectional elevation view and partial schematic diagram of a system embodying the present invention.

In the drawing the solenoid 10 is illustrated, by way of example, in a spacecraft environment. The temperature, during operation, can be well below freezing, which may be too low for proper operation of the solenoid.

Solenoid 10 is mounted to a plate 12 to which is also mounted a spacecraft thruster 14. Plate 12 is mounted to spacecraft housing 13 via terminal insulating layer 15. Layer 15 thermally isolates plate 12 from housing 13. The solenoid 10 has an actuator 16 sometimes termed a plunger or core, formed of magnetic material, which opens and closes a valve 18 which couples liquid propellant 20 via conduit 22 to a catalyst bed 24, thence to the propulsion jet 26 in the thruster 14.

The solenoid 10 comprises two wires bifilarly wound to form coils 28 and 30. The coil 30 is shaded to easily distinguish it from coil 28. Coils 28 and 30 are wound around an electrically non-conducting tube or core 32. The core 32 is secured to plate 12, has vent apertures 34 and a coil supporting flange 36. The core 32 forms a tubular structure with an enclosed end 36. Actuator 16 is biased in direction 38 by spring 40. Actuator 16 is made of ferro-magnetic material and includes a stem 42 having a valve member 44 at the extended end. A wall 46 within the core 32 is flanged at 48 to serve as a guide for the actuator stem 42 and operates as a gas seal therewith. Wall 46 is a circular disc which divides the core 32 into chambers 50 and 52. The chamber 52 is gas-tight and, as mentioned, is sealed from chamber 50 by the stem 42 and wall 46. Wall portion 54 separates chamber 52 from a second chamber 56. Chambers 52 and 56 are coupled only by valve opening 58 in wall portion 54. Wall portion 54 has a conical valve seat 60 which mates with the valve member 44 on stem 42. The chamber 56 is coupled by pipe 62 to pressurized tank 64 containing the liquid propellant 20.

In operation of the valve, when the stem 42 is biased in direction 38 by spring 40, the valve member 44 seals the opening 58 by way of the seat 60. This seals off the chamber 56 from the chamber 52, preventing the flow of the propellant 20 into the chamber 52 from chamber 54. The chamber 52 is coupled to the catalyst bed 24 contained in housing 66 by the conduit 22. A thermally insulating housing 93 secured to plate 12 encloses solenoid 10, conduit 22, housing 66 and a portion of pipe 62. Housing 93 retains heat generated by solenoid 10 which heat warms the elements enclosed within the housing 93.

Coil 28 (unshaded) is wound about core 32 and is connected via leads 70 and 72 to terminals 74 and 76, respectively. Coil 30 is connected via leads 78 and 80 (shaded) to terminals 82 and 84, respectively. Coils 28 and 30 are bifilar wound. Terminal 74 is connected to terminal 86.

A double pole, double throw switch 88, has a pair of wipers 90 and 92. Wipers 90 and 92 are connected to the positive terminal of a DC voltage source such as a battery 94. Wiper 90 contacts terminals 86 and 84 and wiper 92 contacts terminals 84 or 76 in accordance with the switch position. A second double pole, double throw switch 90 has a pair of wipers 100 and 102 which are connected at one end to the negative terminal of battery 94 and at the other end to terminals 76 and 82 or 82 and 74, respectively, depending on the switch position. Dashed line 104 indicates that the switches 88 and 98 are ganged. The switches are operated by control 106. While mechanical switches are shown, it is equally apparent that electronic switches may alternatively be employed.

Switches 88 and 98 have two switch positions as indicated above. In the drawing the switch 88 is shown connected to the leads 70 and 80. The wipers of switch 98 are shown connected to the leads 72 and 78. This applies a positive DC voltage to leads 80 and 70 of the respective coils 30 and 28 and the negative return to battery 94 through leads 72 and 78 of these coils. The battery 94 and switches 88 and 98 are carried inside of the spacecraft on the same side of plate 12 as solenoid 10, this portion of the drawing being schematic in form.

The coils are wound so that the DC currents flow through them in opposite directions. These opposite direction currents (say clockwise around the core 32 in coil 28 and counter-clockwise around the core in coil 30) create opposing magnetic forces within the core 32. These opposing magnetomotive forces tend to neutralize each other because the coils 28 and 30 are equidistant from the core center, contain the same number of windings, are the same wire size and have the same voltage magnitudes applied thereto. These opposing neutralizing magneto-forces therefore do not have any effect on the operation of solenoid actuator 16. Therefore, the stem 42 remains in the closed valve position as shown.

When the control 106 switches the position of switches 88 and 98 to the second switch position, then wiper 90 applies a positive voltage to lead 80 and wiper 92 applies a positive voltage to lead 72. The wiper 100 applies a negative voltage to lead 78 and wiper 102 applies a negative voltage to lead 70. In this instance the DC currents of the two coils 28 and 30 are the same polarity, flow in the same direction and create magneto-forces within the core 32 which reinforce each other and are additive. These magneto-forces create a magnetic field within the core 32 which pulls on the actuator 16 in a direction opposite direction 38, overcoming the force of spring 40 and opening the valve 18. The propellant 20 in pressurized tank 64 is then free to flow through the valve 18, through the pipe 22, through the catalyst 24 and out the jet 26. It is to be understood that the exterior of the spacecraft is a vacuum which is always coupled to chamber 52 via conduit 22.

It will thus be apparent that regardless the switch position of the switches 88 and 98, DC voltages are always applied to the coils 28 and 30. The DC voltages cause DC current to flow through each coil, which in turn causes resistive heating of each coil. This heating of the coils raises the temperature of the core 32. The core 32, being in conductive heating relationship with the wall portion 54 and with wall 46 raises their temperature also. The temperatures of these elements are increased until they reach an equilibrium above freezing at which the rate of heat increase equals the rate of heat loss. This insures that any moisture present remains in the liquid (or gas) state rather than becoming solid (freezing) and the actuator stem 42 therefore is prevented from freezing to the guide flange 48 and the valve seat 44. Were there no heating, these elements might tend to freeze together and the magnetic forces applied to the coils 28 and 30 in response to a control current could be insufficient to free them. This structure, therefore, does not require additional separate heaters to prevent freezing of the actuator 16.

The thermal housing 93 retains the heat generated by the coils 28 and 30 and the elements within the housing stay warm. Chamber 52, being normally coupled to a vacuum, has low mass and requires negligible heat. This permits the adjacent elements such as walls 46 and 54, and conduit 22 to be readily heated by the coils by conduction. The chamber 56 is relatively small in volume and the propellant in this chamber is of sufficiently small mass so as to permit heating of the adjacent elements about freezing. As a result, the thruster 14 is also heated and this prevents ice from clogging the jet 26.

What is claimed is:

1. A solenoid comprising:
   coil means so wound that a DC voltage applied in one sense causes currents to flow through the coil means which produces additive magnetomotive forces along a common axis, and said DC voltage applied in a second sense causes currents to flow through the coil means which produce two opposing magnetomotive forces along said common axis which tend to neutralize one another,
   means for selectively applying said DC voltage to said coil means either in said one sense for producing said additive magnetomotive forces along said axis, or in a second sense for producing said opposing magnetomotive forces which neutralize each other along said axis, and
   actuating means responsive to said magnetomotive forces, normally in a first position when said forces are neutralized and displaced to a second position along said axis in response to said additive forces.

2. The device of claim 1 wherein said coil means comprises a ferro-magnetic core and two bifilar wound coils around said core.

3. The device of claim 2 wherein said means for selectively applying the DC voltage includes a DC voltage source and switch means between said source and said coil means for causing current flow in the same direction through the two coils when the voltage is applied in said one sense and for causing current flow in one direction through one of said two coils and in the opposite direction through the other of said two coils when the voltage is applied in said second sense.

4. The device of claim 1 wherein said actuating means includes bias means for biasing said actuating means in said first position, said additive forces having a combined force greater than that of said bias means.

5. The device of claim 1 further including valve means connected to said actuating means.

6. A solenoid device comprising:
   first and second coil means responsive to applied DC voltages for producing respective first and second magnetomotive forces,
   means for positioning said coil means so the magnetomotive forces are additive when the applied DC voltages are of like polarity and oppose and neutralize each other when the voltages are of opposite polarities,
   actuating means within the field of said forces and responsive to said additive magnetomotive forces for displacing from a first to a second position,
   bias means for normally biasing said actuating means to said first position in the absence of said additive magnetomotive forces, and
   means for selectively applying said like and unlike polarity voltages to said first and second coil means.

7. A self-heated solenoid comprising:
   two coils on a common axis,
   a core formed of magnetic material within the coils, supported for movement along the axis, and
   means for heating the solenoid comprising means for substantially continuously applying direct currents to the two coils for ohmically heating the coils to a temperature substantially greater than the ambient temperature, said means for applying direct currents comprising:
   means for applying said direct currents in the same direction through both coils for producing additive magnetomotive forces for driving said core along said axis when it is desired to energize said solenoid, and
   means for applying said direct currents in opposite directions through the two coils, respectively, for producing subtractive magnetomotive forces which tend to cancel one another, when it is desired that the solenoid remain unenergized.

8. A self-heated solenoid as set forth in claim 7, further including:
   a housing formed of heat insulating material enclosing said solenoid for retaining the heat produced by the coils.

9. A self-heated solenoid as set forth in claim 8, further including:
   a load which it is desired to heat, in heat conductive contact with said core of said solenoid.

10. A self-heated solenoid comprising, in combination:
    coil means of the type which can produce two additive magnetomotive forces, or two subtractive magnetomotive forces which tend to cancel, depending upon the direction of application of a DC voltage to said coil means,
    a core within the coil means, and
    means for substantially continuously applying a DC voltage across said coil means (1) in a sense to create two additive magnetomotive forces for moving the core, when it is desired to actuate the solenoid and (2) in a sense to create two subtractive magnetomotive forces which tend to cancel one another when it is desired that the solenoid remain in its unactuated condition, the DC voltage being applied, in both cases (1) and (2), at a level to create sufficient resistive heating of the coil means to maintain the solenoid at a temperature substantially above the ambient temperature.

* * * * *